United States Patent [19]

Oikawa

[11] Patent Number: 4,871,134
[45] Date of Patent: Oct. 3, 1989

[54] CLIP FOR SECURING A WIRING HARNESS

[75] Inventor: Ryuetsu Oikawa, Kosai, Japan

[73] Assignee: Yazaki Corporation, Tokyo, Japan

[21] Appl. No.: 278,757

[22] Filed: Dec. 2, 1988

[30] Foreign Application Priority Data

Dec. 9, 1987 [JP] Japan .......................... 62-186379[U]
Feb. 12, 1988 [JP] Japan ............................. 63-16406[U]

[51] Int. Cl.⁴ .............................................. F16L 3/08
[52] U.S. Cl. ....................................... 248/65; 248/63;
248/903
[58] Field of Search ...................... 248/65, 58, 60, 61,
248/63, 62, 903, 916

[56] References Cited

U.S. PATENT DOCUMENTS

| 974,681 | 11/1910 | Le Manquais | 248/916 X |
| 3,026,077 | 3/1962 | Peterson | 248/63 |
| 3,261,582 | 7/1966 | Bethea | 248/63 |
| 3,539,139 | 11/1970 | Eucker | 248/63 |
| 4,796,841 | 1/1989 | Baker et al. | 248/60 |

FOREIGN PATENT DOCUMENTS 59-115181  8/1984  Japan .

OTHER PUBLICATIONS

Flexure Devices–For Economy Action (pp. 176–177), (date unknown).

Primary Examiner—Ramon O. Ramirez
Attorney, Agent, or Firm—Robbins & Laramie

[57] ABSTRACT

The clip for securing a wiring harness in position has a holder portion for holding the wiring harness and a flange portion extending transversely from the holder portion for securing the clip to a fixed part of the vehicle structure. The flange portion is pivotably connected to the holder portion so that the former, in assembly, can be collapsed in parallel to the latter from the normally erect position, reducing the overall dimension of the combined clip and harness to facilitate insertion of the combination through a panel hole of relatively smaller dimension. This reduces the assembly cost and improves the assembly efficiency. Another form of clip is provided at its flange portion with a flexibly bendable constrictive portion formed in the middle of the flange portion. The clip also can be bent via the constrictive portion, reducing its overall dimension, and attains the same effect as the first mentioned clip. The clip further is provided at its flange portion with reinforcement means of rigidity adapted to be abutted against and latched on the bendable constrictive portion. The reinforcement means of profile complemental to that of the bendable constrictive portion, serves to render the latter portion unbendable or rigid for attaining reliable positioning of the wiring harness relative to the fixed part. Any risks of the wiring harness or associated parts e.g. connectors being dislocated or displaced due to vibrations occuring in the vehicle thus can be avoided.

5 Claims, 5 Drawing Sheets

CLIP FOR SECURING A WIRING HARNESS

BACKGROUND OF THE INVENTION

1. Field of the Invention

The present invention relates to an improved clip for securing wiring harnesses in position within their respective mounting spaces in an automobile, for example. More specifically, the invention relates to such clip as specified wherein it is flexible in design so as to reduce its overall dimension for facilitation of the assembly procedure. Further, the invention relates to the same wherein means for nullifying that flexibility is provided thereby attaining highly reliable fixing of the wiring harness as well as improvements on the assembly efficiency of wiring harnesses.

2. Description of the Prior Art

There has commonly been used, in a vehicle e.g. an automobile, clips for securing wiring harnesses consisting of bundled wirings in position in respectively variously located mounting spaces. The conventional clip is usually of a T-shaped construction including a holder portion and a transverse flange portion. The former is adapted for longitudinal support of a wiring harness, to which the clip is intended to be applied, while the latter being provided with a clamp for fastening the clip to a fixed part of the vehicle structure.

In assembly, the clip is first brought into contact with the associated wiring harness, binding the two members together by use of fastening tapes wound therearound. This combination then is applied to its mounting position through a hole formed on the enclosing panel or wall defining the mounting space, and the clip is secured via its clamp to the fixed part of the vehicle structure.

With this ordinary clip, the assembly work has hitherto been encountered with the problems that it is almost always necessary to provide the enclosing panel or wall defining the mounting space with through-holes of greater dimension than the overall dimension of the clip, otherwise the two members i.e. the clip and the wiring harness would have to be combined together laboriously in so a tight space after the clip alone has once been brought into the mounting space through the hole; the provision of unnecessarily greater through-holes on the panel or wall may result in deterioration of the panel strength or may be accompanied by extra jobs of subsequently covering or stopping up the greater dimensioned holes; uneconomy in cost and man-hour required in the assembly procedure may result therefrom.

Therefore, the invention aims, in one aspect, to provide an improved clip for securing an associated wiring harness in position in an automobile, in which the above-stated drawbacks can be eliminated so as to improve the assembly efficiency of wiring harnesses.

Further, it has been proposed in an attemp to obviate the above problems, to use a clip which is formed on its flange portion with lateral recesses or grooves of adequate configuration in order to make the flange portion easily bendable via this constriction. When assembling the wiring harness into its prescribed mounting position, this clip can be reduced in dimension by bending the flange portion via its constriction so that it may be inserted, through a comparatively small hole on the panel, into its mounting position. Nevertheless, this clip suffered from the problems that due to objectionable vibrations or shocks occurring in the vehicle, the clip as secured to the fixed part of the vehicle may cause bending of its flange portion, which in turn causes loose securing of the wiring harness relative to the fixed part of the vehicle structure, resulting in an undesirable displacement of the harness. This may tend to dislocate connectors installed at the junctions of the wiring harness.

The invention, therefore, has also been devised in consideration of the foregoing, and in another aspect, aims to provide a unique clip of the type which is provided with reinforcing means of rigidity adapted, upon the insertion of the clip and harness in combination through the panel hole, to be complementarily abutted against the bendable constriction of the flange portion to render the flange portion unbendable with its rigidity, attaining increased reliabilities of secure positioning of the wiring harness.

SUMMARY OF THE INVENTION

To achieve the first mentioned object of the invention, there is provided a clip consisting of a holder portion adapted for longitudinally holding an associated wiring harness and a flange portion adapted for securing the clip to a fixed part of the vehicle structure, characterized in that the flange portion is pivotably connected to the holder portion in such manner that the former be erected upright and prostrated in parallel with respect to the latter. This feature of the invention makes it possible, when assembling the wiring harness, to insert the combination of clip and wiring harness, with the flange portion of the former being prostrated in parallel to the latter to provide reduction in dimension of the combination, through a correspondingly relatively small hole on the panel into the mounting space.

Further, to achieve the second object of the invention, there is provided a clip consisting of a holder portion adapted for longitudinally holding an associated wiring harness and a flange portion adapted for securing the clip to a fixed part of the vehicle structure, wherein the flange portion is formed with lateral grooves or recesses to provide a flexibly bendable portion of constriction, characterized in that the flange portion of the clip is provided at its distal end with a retainer portion engageable with the fixed part of the vehicle structure while the clip is provided with reinforcement means of rigidity complementarily applicable, upon completion of the insertion of the combination through the panel hole, to the bendable constriction of the flange portion and being adapted to render the bendable constriction unbendable with its rigidity, thereby protecting the wiring harness from the risk of objectionable diaplacement relative to the fixed part of the vehicle structure due to vibrations or shocks occurring in the vehicle.

DETAILED DESCRIPTION OF THE PREFERRED EMBODIMENTS

Figure 1:
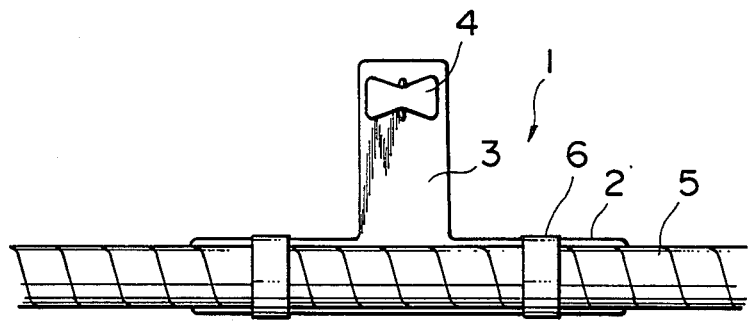
FIG. 1 is a front view of a conventional clip.

The conventional clip 1 shown in FIG. 1 consists of a holder portion 2 and a transverse flange portion 3 formed integral with each other, which flange portion 3 being provided with a clamp 4 adapted to be secured to a suitable retainer (not shown) provided on a fixed part of the vehicle structure.

Figure 2:
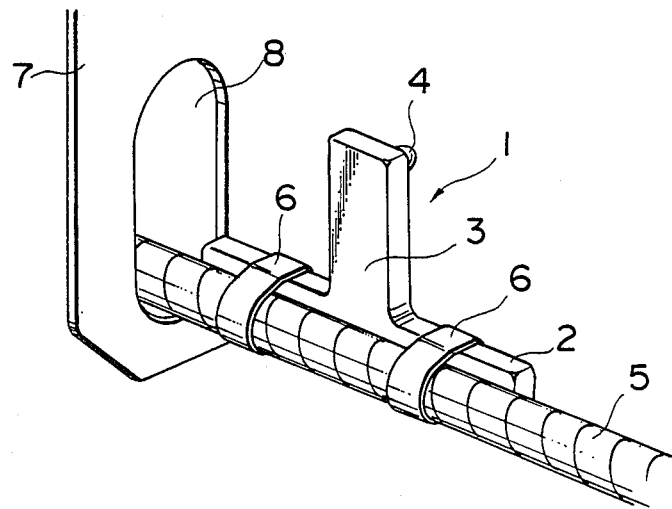
FIG. 2 is a perspective view schematically showing how the combined clip and wiring harness is assembled into its mounting position through a hole on the enclosing panel.

In assembly of the clip into its mounting position, the two members of clip and wiring harness 5 are bound together, with the holder portion 2 being in longitudinal contact with the harness, by winding fastening tapes 6 therearound, as shown in FIG. 2. This combination then is applied, through a hole 8 provided on an enclosure panel or wall 7 defining a clip mounting space, into position, and the clamp 4 is secured to the retainer (not shown) on the fixed part of the vehicle structure.

According to this procedure, it has been necessitated to provide a through-hole 8 of a dimension greater than the maximum dimension of the clip, on the panel or wall 8 enclosing or covering the mounting space. The provision of unnecessarily greater holes naturally results in deterioration of the panel strength, or involves extra works of subsequently stopping up the greater holes. Otherwise, it would be required to firstly insert the clip alone through the panel hole and then the wiring harness is secured to the holder portion 2 of the clip. This adds to complicated procedures resulting in considerable uneconomy of assembly cost and man-hour involved.

Figure 3A:
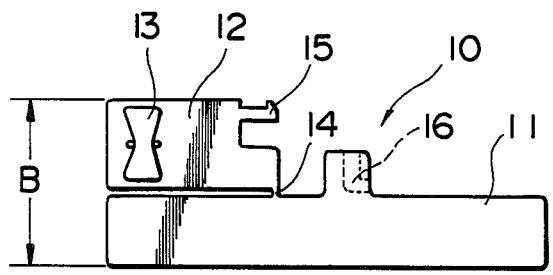
FIGS. 3A and 3B respectively are front views of a clip according to one embodiment of the invention.
Figure 3B:
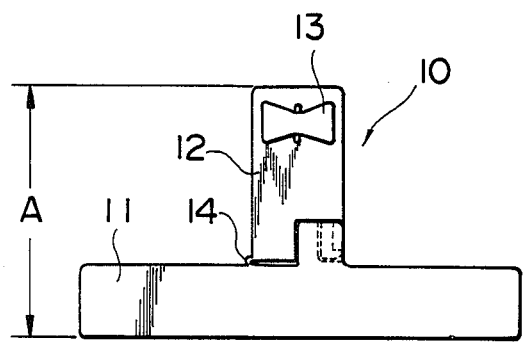
Figure 4A:
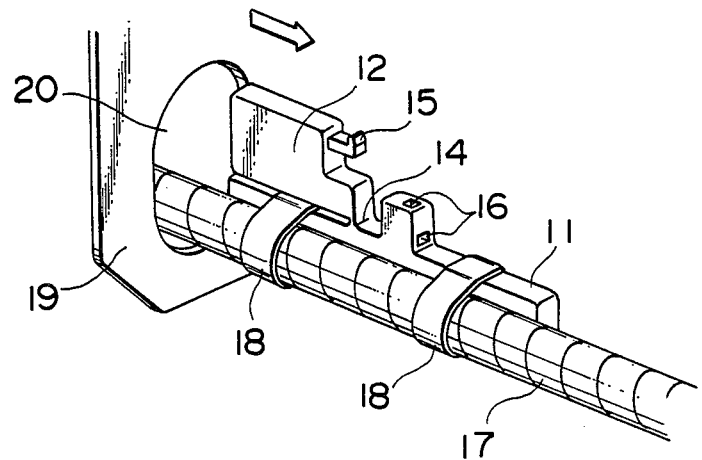
FIGS. 4A and 4B respectively are perspective views schematically showing how the combined clip of FIG. 3 and wiring harness is assembled into its mounting position through a hole on the enclosure panel.

According to the invention, as shown in FIGS. 3A and 3B, there is provided a clip 10 consisting of a holder plate-like portion 11 for holding a wiring harness 17 (FIG. 4) through a longitudinal contact therebetween and a flange portion 12 having a clamp 13 for securing the clip to the panel.

At the bottom of the flange portion 12 provided a latch structure consisting of a hinge 14, a retainer pawl 15 and a retainer hole 16. As shown in FIG. 3A, the flange portion 12 can be collapsed in parallel to the holder portion via the hinge 14.

The clip 10 thus can be reduced of its dimension as from A to B, as shown in FIGS. 3A and 3B.

When assembling the inventive clip 10 into its mounting space in the vehicle structure, the two members of clip and wiring harness are bound together by winding fastening tapes 18 therearound, and the flange portion 12, with the retainer pawl 15 disengaged from the hole 16, is collapsed via the hinge 14 into a substantially parallel relation to the holder portion 11.

With the flange portion 12 being thus reduced in height, the combined clip and wiring harness can easily be inserted through a hole 20 dimensioned not greater than the normal height A of the clip (FIG. 3B).

Figure 4B:
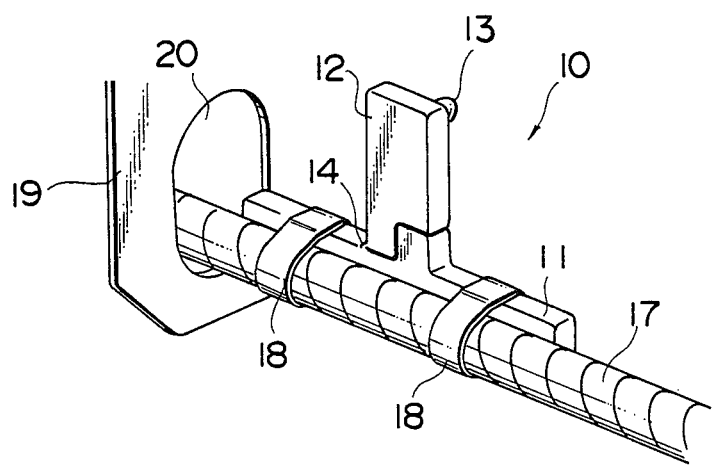

After the insertion of the clip 10, as shown in FIG. 4B, the flange portion 12 is erected again via the hinge 14, and after the retainer pawl 15 is fastened through a fixed part of the vehicle structure thus the securing of the wiring harness in position being completed.

As having described in the foregoing, since the clip according to the invention has its flange portion arranged for erectile and collapsible movement in relation to the holder portion, the flange portion can be folded in parallel to the holder portion. It is, therefore, possible to insert the combined clip and wiring harness, with the flange portion thus being collapsed, quite easily through a hole on the panel which has only to be dimensioned not greater than the normal height of the clip. Those problems encountered with the conventional clip as described hereinbefore can be eliminated.

Figure 5:
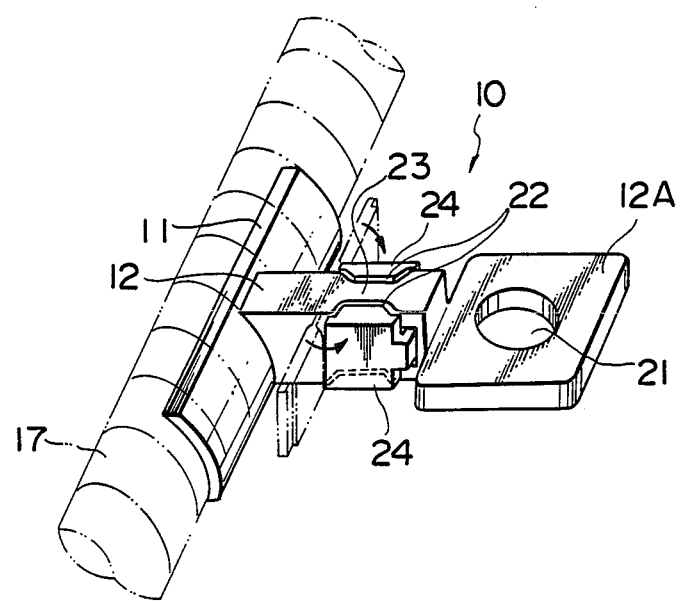
FIG. 5 is a perspective view of a clip according to another embodiment of the invention showing how its reinforcement means operates.
Figure 6:
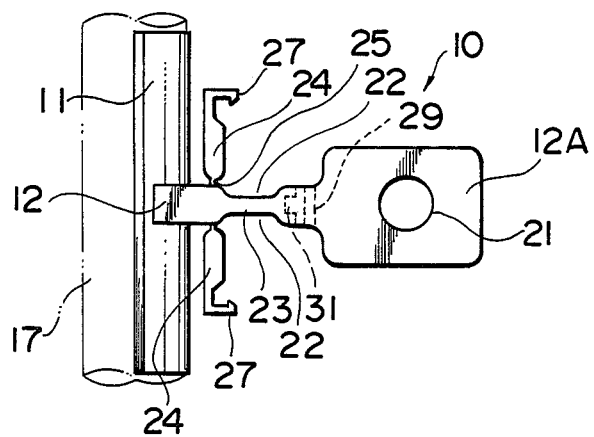
FIG. 6 is a plan view of the FIG. 5 clip however with the flexibly bendable constriction being not reinforced by the reinforcement means.
Figure 7:
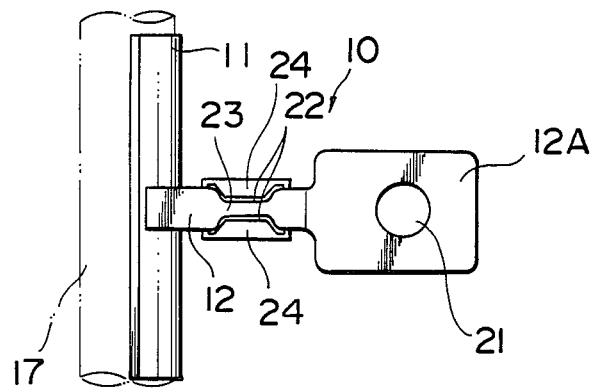
FIG. 7 is a view similar to FIG. 6 however with the flexibly bendable constriction being rendered unbendable or rigid by the application of the reinforcement means.

According to another embodiment of the invention, as shown in FIGS. 5 to 7, a clip 10 includes a harness holding portion 11 with a transverse flange portion 12 having at its end opposite to the holder portion 11 a retainer portion 12A for securing the clip to a fixed part (not shown), e.g. a panel in the vehicle structure. The retainer portion 12A is provided with a hole 21 through which a fastening bolt is to be penetrated for securing the clip to the panel. The retainer portion may alternatively be in the form of a hook applicable into a mating hole formed on the fixed part.

The clip 10, further, is provided at the lateral sides and in the middle of its flange portion with grooves or recesses 22 of proper configuration so as to form a flexibly bendable constriction 23. Hence, the clip 10 can easily be bent elastically via the bendable constriction 23. To this end, the clip may be made of a proper polymer material.

Still further, the clip is provided on both lateral sides of the base portion of the flange portion 12 with reinforcement members of rigid material 24,24 pivotably mounted via hinges 25,25 on the base portion, which reinforcement members 24,24 being shaped complemental to the grooves 22,22. The reinforcement members 24,24 each have retainer pawls 27,27 formed at their free ends, which pawls in turn are engagable in a retainer portion 31 of a retainer hole 29 of proper configuration formed through the end portion of the flange portion 12 opposite to the base portion.

With the above described construction, the clip 10 can be bent at the bendable constriction 23, whenever so desired. On the other hand, when the reinforcement members 24,24 are applied fittingly into the grooves 22,22, and their retainer pawls are engaged in the retainer portion 31 of the hole 29, the bendable constriction 23 of the flange portion is reinforced as unbendable because of rigidity of the applied members 24,24, as shown in FIG. 7. Accordingly, it is possible to prevent the thus mounted wiring harness from objectionably being displaced relative to the fixed part of the vehicle structure thus ensuring reliable positioning of the harness with respect to the fixed part.

It has to be noted that the invention is not necessarily limited to the above illustrated embodiments but may equally alternatively be practiced in different ways within its scope. For instance, the flexibly bendable constriction of the flange portion may be formed with a single groove on its one lateral side in lieu of two grooves; the positions of pivotable attachment of the reinforcement members and of the retainer hole may be reversed relative to each other in design.

For formation of the bendable constriction, furthermore, the flange portion of the clip may be provided in its middle with a through-hole extending across its width generally in the longitudinal direction of the holder portion, in stead of groove structure, to form a flexibly bendable constriction. In this case, it has only to be arranged that suitably shaped reinforcement portions of the reinforcement members be fittingly and detachably engagable in the through-hole.

Though in the illustrated embodiments, the clip has been described as bendable in a direction longitudinally of its holder portion, it may equally be constructed such as bendable in a direction rectangular to the longitudinal axis of the holder portion.

As will be appreciated from the above description, it can be assured, by virtue of the unique arrangement of the reinforcement members, that after assembling into position, the wiring harness is firmly secured, through rigidity of the reinforced constriction, to the fixed part of the vehicle structure. Secure positioning of the wiring harness in relation to the fixed part of the vehicle structure thus can be effected in a most reliable manner. This eliminates the risks of electrical parts e.g. connectors at the junctions of the wiring harnesses being dislocated or coming off due to objectionable vibrations or shocks occurring in the vehicle.

What is claimed is:

1. A clip for securing a wiring harness in position for use in a vehicle e.g. an automobile, comprising a holder portion for longitudinally holding the wiring harness and a flange portion transversely extending from the holder portion, which flange portion being provided, at the end thereof opposite to said holder portion, with latch means engageable with a fixed part of the automobile structure while being provided in the middle thereof, with a flexibly bendable constrictive portion, wherein reinforcement means is provided for reinforcing said flexibly bendable constrictive portion as unbendable or rigid.

2. A clip for securing a wiring harness in position for use in a vehicle e.g. an automobile according to claim 1, wherein said reinforcement means comprises a pair of platelike members each connected pivotable to the base portion of the flange portion and being contoured complemental to the contour of said flexibly bendable constrictive portion so as to render said bendable constrictive portion unbendable or rigid.

3. A clip for securing a wiring harness in position for use in a vehicle e.g. an automobile according to claim 1, wherein said flange portion is made of a polymer material while said reinforcement means is made of a rigid material.

4. A clip for securing a wiring harness in position for use in a vehicle e.g. an automobile according to claim 1, wherein said clip further is provided with latch means for holding the reinforcement means as abutted against said flexibly bendable constrictive portion.

5. A clip for securing a wiring harness in position for use in a vehicle e.g. an automobile according to claim 1, wherein said latch means comprises retainer pawls formed on said reinforcement means and a catch recess formed on said flange portion adapted for catching engagement with said mating retainer pawls when said reinforcement means is applied to said flexibly bendable constrictive portion.

* * * * *